No. 652,624. Patented June 26, 1900.
F. P. MAUS.
ROLLS FOR REDUCING LOCOMOTIVE WHEEL TIRES.
(Application filed Apr. 19, 1899.)
(No Model.)
Fig. 1.
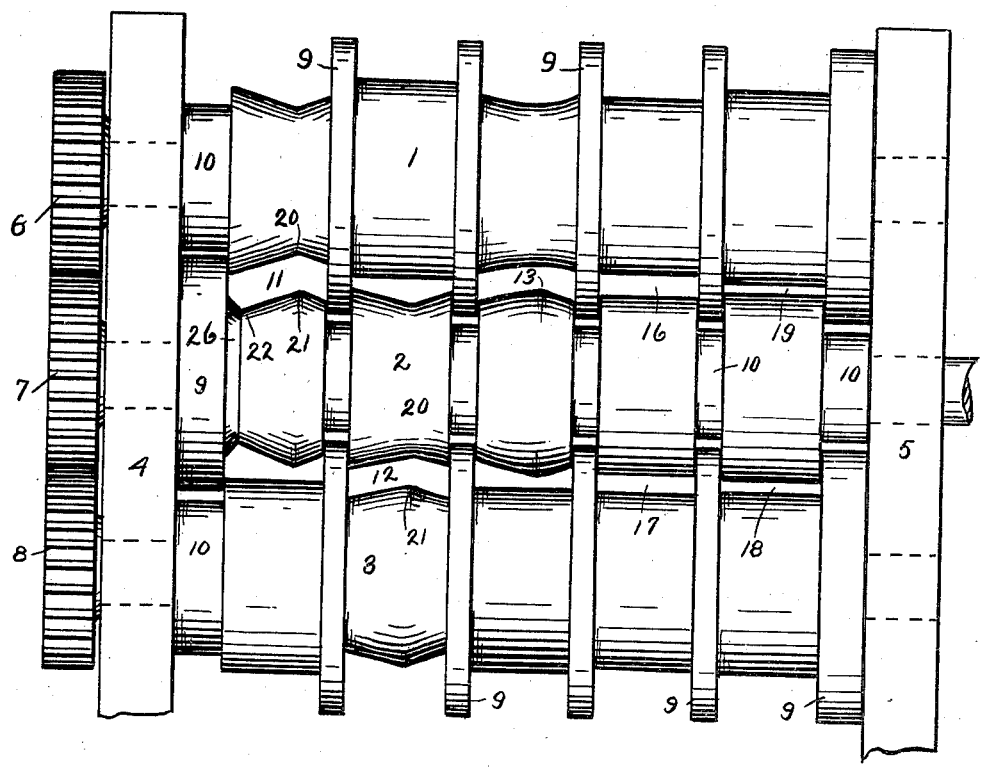
Fig. 2.
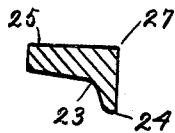
Fig. 3.
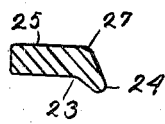
Fig. 4.
Fig. 5.
WITNESSES:
INVENTOR.
Frederick P. Maus
BY
his ATTORNEY.

UNITED STATES PATENT OFFICE.

FREDERICK P. MAUS, OF ELWOOD, INDIANA, ASSIGNOR OF ONE-THIRD TO HORACE M. BATT, OF INDIANAPOLIS, INDIANA.

ROLL FOR REDUCING LOCOMOTIVE-WHEEL TIRES.

SPECIFICATION forming part of Letters Patent No. 652,624, dated June 26, 1900.

Application filed April 19, 1899. Serial No. 713,614. (No model.)

*To all whom it may concern:*

Be it known that I, FREDERICK P. MAUS, of Elwood, county of Madison, and State of Indiana, have invented a certain new and useful Roll for Reducing Locomotive-Wheel Tires, &c.; and I do hereby declare that the following is a full, clear, and exact description thereof, reference being had to the accompanying drawings, in which like figures refer to like parts.

This invention is a process and rolls for reducing old locomotive-wheel tires into merchantable forms of steel, whether flats or rounds.

Heretofore the tires of old locomotive-wheels have been largely thrown away, because no practical method or means for reducing the same has been known or used except remelting, which is very expensive and wasteful. This waste is all the greater loss because of the very high quality of steel employed in making the tires of locomotive-wheels, and therefore with my method and means for reducing the same a steel product of the very highest quality and value is produced.

My process consists not in rolling the tire flat directly, and thereby causing laps of folds in the resultant product when the flange of the tire is rolled down on the body of the tire, but to gradually turn the flange of the tire to the outside of the rim and lining it up with the main body of the tire, which latter is very gradually worked over or modified. Considering the tire in cross-section, it is only the half that the flange is on which is materially modified and reduced.

The full nature of this process and the means for carrying it out will appear from the accompanying drawings and the description and claim following.

In the drawings, Figure 1 shows a set of rolls in elevation which together form passes suitable for the reduction of the locomotive-wheel tires. Fig. 2 is a cross-section of a tire. Fig. 3 shows the form after passing through the first pass. Fig. 4 shows the form after passing through the second pass. Fig. 5 shows the form after passing through the third pass.

I show here three rollers 1, 2, and 3, mounted in suitable frames 4 and 5 and having spindles carrying engaging gears 6, 7, and 8. The means for mounting and driving these rolls are immaterial. Each pair of rolls is provided with a series of cut-off collars 9, that operate in corresponding grooves 10. These are likewise old and divide the rolls into sections which coöperate to form passes through which the material is passed in its reduction.

The new and essential passes employed in this process are those numbered 11, 12, and 13. The tire is passed through these in the order named and afterward reduced by any suitable means to any desired form. I show here the passes 16, 17, 18, and 19 for reducing it to flats. The first pass, or pass 11, is formed by the surface of one roller being gradually enlarged from one end to a point 21, then gradually contracted about one-third the distance from said end. From this point it is gradually contracted to a point 22, rather close to the other end. From the point 22 to the other end it is rapidly enlarged, the angle at the point 22 being not much more than a right angle. The angle at the point 21 is a very obtuse one, being more obtuse than the angle at 23 between the flange 24 of the tire and the body 25, as shown in Fig. 2. The corresponding roll is gradually contracted from both ends to a point 20 about one-third the distance from one end and registering with the enlargement at the point 21 in the other roll. This makes the surface of the last-mentioned roll substantially parallel with the surface of the first-mentioned roll, excepting the enlargement 26. The positive and transforming roll forming this pass is the one on the roller 2 carrying the fuller 21. This fuller, being more obtuse than the angle between the flange and body of the tire, forces the flange sidewise to the right. Coöperating with this the upper roll breaks down very slightly the corner 27 of the tire, which fits in the groove 20 in said upper roll. The left-hand edge or surface of the tire bears against the flange 26 of the lower roll. When the tire has gone through the first pass 11, its form is that shown in Fig. 3. The angle 23 as there seen is considerably enlarged, the flange 24 is turned much farther to the right, and the corner 27 is broken down somewhat. This form of the material is then passed through the second pass 12. There the angle of the contraction 20 of the upper roll is more obtuse than in the roll forming the first pass; but otherwise there is no change in the form of the upper roll. The lower roll omits the flange 26, but is otherwise formed substantially the same, the fuller 21, however, not being so sharp. This pass tends to further force the flange 24 of the tire to the right and more in line with the body 25 thereof. The upper roll tends further to flatten the point 27 of the tire. When the tire is passed through this pass 12, it has the form shown in Fig. 4, where it is observed the angle 23 has become more obtuse and the corner 27 more flattened, and the pass is almost a curve in cross-section. The material is then put through the pass 13, which is formed by the surface of the upper roller being slightly concave and the other roller being slightly convex; but said pass 13 preserves the general contour of the passes 11 and 12, except that the angularity of the same is increased. This roller tends to further push the flange 24 over in line with the body 25 and transforms the material into the shape shown in Fig. 5, which is substantially a regular curve in cross-section. It is next put through the pass 16, which makes it flat, and it is then reduced to flats or rounds by putting it through passes of suitable shape. Before the tires are subjected to the operation above described they are cut into three substantially-even parts and each part reduced separately.

What I claim as my invention, and desire to secure by Letters Patent, is—

A set of rolls for reducing a locomotive-wheel tire or similar form, provided with a series of passes each of which is formed by a fuller in one roll and a groove in the corresponding roll, said fuller being formed by enlarging the roll so that its surface regularly converges from its ends to a point approximately one-third the distance between said ends, the groove being formed by contracting the roll so that its surface likewise regularly converges from its ends to a point approximately one-third the distance between said ends, whereby said groove is in alinement with said fuller and the surfaces of the two rolls are substantially parallel, the angles of the fullers and grooves in the various passes being gradually increased from the first to the end of the series.

In witness whereof I have hereunto affixed my signature in the presence of the witnesses herein named.

FREDERICK P. MAUS.

Witnesses:
N. W. AGUR,
H. M. BROWN.